(12) United States Patent
Ngahu

(10) Patent No.: US 10,930,431 B2
(45) Date of Patent: Feb. 23, 2021

(54) POWER TRANSMISSION UNIT

(71) Applicant: Yazaki Corporation, Tokyo (JP)

(72) Inventor: Antony Wambugu Ngahu, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 69 days.

(21) Appl. No.: 16/548,785

(22) Filed: Aug. 22, 2019

(65) Prior Publication Data

US 2020/0098514 A1    Mar. 26, 2020

(30) Foreign Application Priority Data

Sep. 26, 2018  (JP) ................. 2018-180380

(51) Int. Cl.
| | |
|---|---|
| *H01F 38/14* | (2006.01) |
| *H02J 50/10* | (2016.01) |
| *H01F 27/28* | (2006.01) |
| *H01F 41/06* | (2016.01) |
| *H02J 7/02* | (2016.01) |
| *H04B 5/00* | (2006.01) |
| *H02J 50/00* | (2016.01) |

(52) U.S. Cl.
CPC .......... *H01F 38/14* (2013.01); *H01F 27/28* (2013.01); *H01F 41/06* (2013.01); *H02J 7/025* (2013.01); *H02J 50/10* (2016.02); *H04B 5/0012* (2013.01); *H02J 50/005* (2020.01)

(58) Field of Classification Search
CPC .......... H01F 38/14; H01F 27/28; H01F 41/06; H02J 50/10; H02J 7/025; H02J 50/005; H04B 5/0012

USPC ............................................. 307/104
See application file for complete search history.

(56) References Cited

U.S. PATENT DOCUMENTS

| | | | | |
|---|---|---|---|---|
| 9,793,718 | B2* | 10/2017 | Chiyo | H04B 5/00 |
| 9,812,256 | B2* | 11/2017 | Yang | H01F 38/14 |
| 10,447,065 | B2* | 10/2019 | Hwang | H01F 27/22 |
| 10,566,824 | B2* | 2/2020 | Jin | H01F 27/36 |
| 10,658,740 | B2* | 5/2020 | Noh | H02J 50/70 |
| 2008/0164844 | A1* | 7/2008 | Kato | H02J 50/60 |
| | | | | 320/114 |

(Continued)

FOREIGN PATENT DOCUMENTS

| | | |
|---|---|---|
| EP | 2 750 145 A1 | 7/2014 |
| JP | 2010-16235 A | 1/2010 |

(Continued)

*Primary Examiner* — Daniel J Cavallari
*Assistant Examiner* — Kalu Kelly Emeaba
(74) *Attorney, Agent, or Firm* — Kenealy Vaidya LLP

(57) ABSTRACT

In a power transmission unit, a first coil pattern group and a second coil pattern group are connected with each other with an upper layer outer pattern, located outside in an axial line direction and outside in the intersecting direction, connected with a lower layer inner pattern, located outside in the axial line direction and inside in the intersecting direction. Furthermore, the first coil pattern group and a second coil pattern group are connected with each other with a lower layer outer pattern, located inside in the axial line direction and outside in the intersecting direction, connected with an upper layer inner pattern, located inside in the axial line direction and inside in the intersecting direction.

8 Claims, 11 Drawing Sheets

(56) References Cited

U.S. PATENT DOCUMENTS

| | | | |
|---|---|---|---|
| 2011/0050380 A1* | 3/2011 | Nakanishi | H01F 27/341 |
| | | | 336/200 |
| 2011/0102125 A1 | 5/2011 | Tamura et al. | |
| 2013/0222101 A1* | 8/2013 | Ito | H01F 5/003 |
| | | | 336/83 |
| 2015/0054455 A1* | 2/2015 | Kim | H02J 7/0042 |
| | | | 320/108 |
| 2015/0061400 A1* | 3/2015 | Park | H01F 38/14 |
| | | | 307/104 |
| 2015/0130291 A1* | 5/2015 | Lim | H01F 27/2804 |
| | | | 307/104 |
| 2016/0121731 A1 | 5/2016 | Matsumoto et al. | |
| 2017/0317506 A1 | 11/2017 | Lim et al. | |
| 2017/0345555 A1* | 11/2017 | Jang | H02J 50/10 |
| 2018/0248255 A1* | 8/2018 | Noh | H02J 50/10 |
| 2019/0006094 A1* | 1/2019 | Furiya | H01F 27/2823 |
| 2019/0156995 A1* | 5/2019 | Wu | H02J 7/025 |
| 2019/0304670 A1* | 10/2019 | Chiyo | H01F 27/346 |
| 2020/0005991 A1* | 1/2020 | Wu | H02J 7/0042 |
| 2020/0099858 A1* | 3/2020 | Lee | G09B 19/003 |
| 2020/0235593 A1* | 7/2020 | Jang | H04B 5/00 |
| 2020/0279686 A1* | 9/2020 | Pei | H01F 27/346 |

FOREIGN PATENT DOCUMENTS

| | | |
|---|---|---|
| JP | 2016-92214 A | 5/2016 |
| JP | 2016-93088 A | 5/2016 |
| WO | 98/43258 A2 | 10/1998 |
| WO | 2008/016273 A1 | 2/2008 |

* cited by examiner

POWER TRANSMISSION UNIT

CROSS-REFERENCE TO RELATED APPLICATION(S)

The present application claims priority to and incorporates by reference the entire contents of Japanese Patent Application No. 2018-180380 filed in Japan on Sep. 26, 2018.

BACKGROUND OF THE INVENTION

1. Field of the Invention

The present invention relates to a power transmission unit.

2. Description of the Related Art

A power transmission unit capable of providing wireless electric power transfer, for example, is disclosed as a conventional power transmission device in Japanese Patent Application Laid-open No. 2016-92214. The power transmission device includes a power transmission coil to transmit electric power, an electric power equipment to supply electric power to the power transmission coil, and a housing accommodating the power transmission coil and the electric power equipment. The power transmission device wirelessly transmits electric power from the power transmission coil to a counterpart power receiving coil by electromagnetic induction, with the power transmission coil facing the power receiving coil.

Unfortunately, with the above power transmission device of Japanese Patent Application Laid-open No. 2016-92214, the efficiency of power transmission may decrease during wireless power transmission, for example, and the power transmission device therefore has room for improvement in this point.

SUMMARY OF THE INVENTION

It is an object of the present invention to provide a power transmission unit capable of transmitting power properly with wireless manner.

In order to solve the above mentioned problem and achieve the object, a power transmission unit according to one aspect of the present invention includes a substrate that includes a first layer including a flat plate-like first substrate and a first coil pattern group having a plurality of first coil patterns spirally formed around an axial line and disposed on the first substrate, and a second layer including a flat plate-like second substrate and a second coil pattern group having a plurality of second coil patterns spirally formed around the axial line and disposed on the second substrate, wherein the first coil pattern group has the first coil patterns arrayed along a direction intersecting with the axial line and disposed on respective layers of the first substrate in a manner of being stacked on one over another along an axial line direction, the second coil pattern group has the second coil patterns arrayed in the intersecting direction and disposed on respective layers of the second substrate in a manner of being stacked on one over another along the axial line direction, and the first coil pattern group and the second coil pattern group are connected with each other with the first coil pattern, located outside in the axial line direction and outside in the intersecting direction, connected with the second coil pattern, located outside in the axial line direction and inside in the intersecting direction, and with the first coil pattern, located inside in the axial line direction and outside in the intersecting direction, connected with the second coil pattern, located inside in the axial line direction and inside in the intersecting direction, and wirelessly transmit electric power to a counterpart power transmission coil pattern.

According to another aspect of the present invention, in the power transmission unit, it is preferable that the first coil pattern group and the second coil pattern group are connected with each other with the first coil pattern, located outside in the axial line direction and inside in the intersecting direction, connected with the second coil pattern, located outside in the axial line direction and outside in the intersecting direction, and with the first coil pattern, located inside in the axial line direction and inside in the intersecting direction, connected with the second coil pattern, located inside in the axial line direction and outside in the intersecting direction.

According to still another aspect of the present invention, in the power transmission unit, it is preferable that the first coil pattern group includes the first coil patterns, that are a first upper layer inner pattern, a first upper layer outer pattern located outside the first upper layer inner pattern in the intersecting direction, a first lower layer inner pattern located on the first upper layer inner pattern, particularly on a side closer to the second coil pattern group, and a first lower layer outer pattern located outside the first lower layer inner pattern in the intersecting direction, the second coil pattern group includes the second coil patterns, that are a second upper layer inner pattern, a second upper layer outer pattern located outside the second upper layer inner pattern in the intersecting direction, a second lower layer inner pattern located on the second upper layer inner pattern, particularly on a side opposite the first coil pattern group, and a second lower layer outer pattern located outside the second lower layer inner pattern in the intersecting direction, and in connection of the first coil pattern group and the second coil pattern group, the first upper layer outer pattern is connected with the second lower layer inner pattern, the first upper layer inner pattern is connected with the second lower layer outer pattern, the first lower layer outer pattern is connected with the second upper layer inner pattern, and the first lower layer inner pattern is connected with the second upper layer outer pattern.

According to still another aspect of the present invention, in the power transmission unit, it is preferable that in connection of the first coil pattern group and the second coil pattern group, ends of the first coil patterns closer to the axial line are connected with ends of the second coil patterns closer to the axial line.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will now be described in detail with reference to the accompanying drawings. The following description of the embodiments is not intended to limit the present invention. Components described below include what the skilled person can easily conceive and what are substantially the same. The components described below can be combined as appropriate. Various omissions, substitutions, and modifications can be made without departing from the scope of the present invention.

Embodiment

Figure 1:
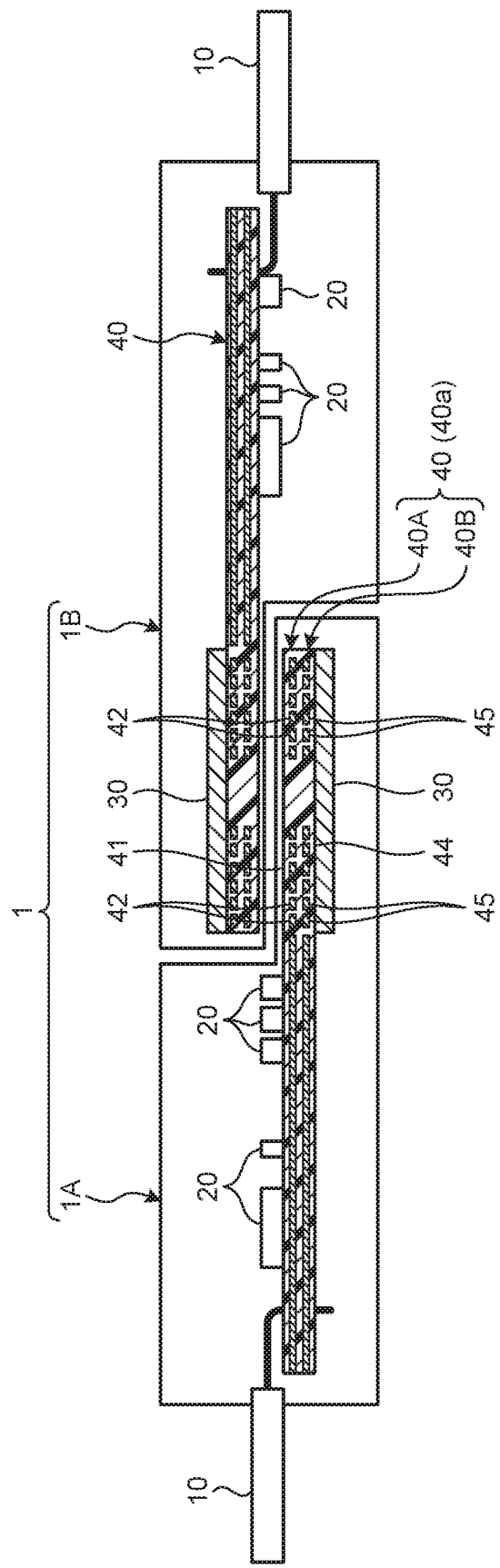
FIG. 1 is a sectional view illustrating a configurational example of a power transmission device according to an embodiment.
Figure 2:
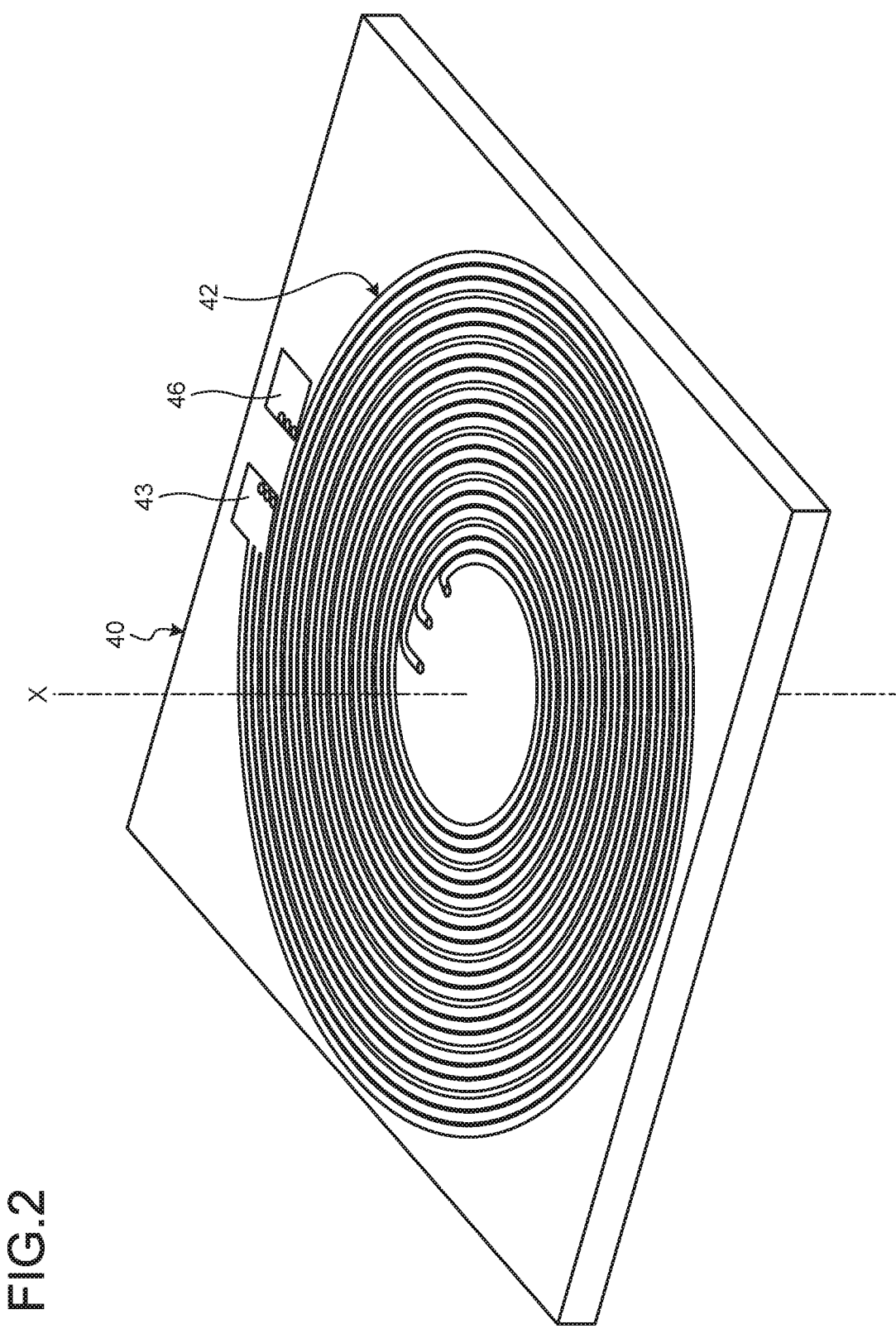
FIG. 2 is a perspective view illustrating a configurational example of a multilayer substrate according to the embodiment.
Figure 3:
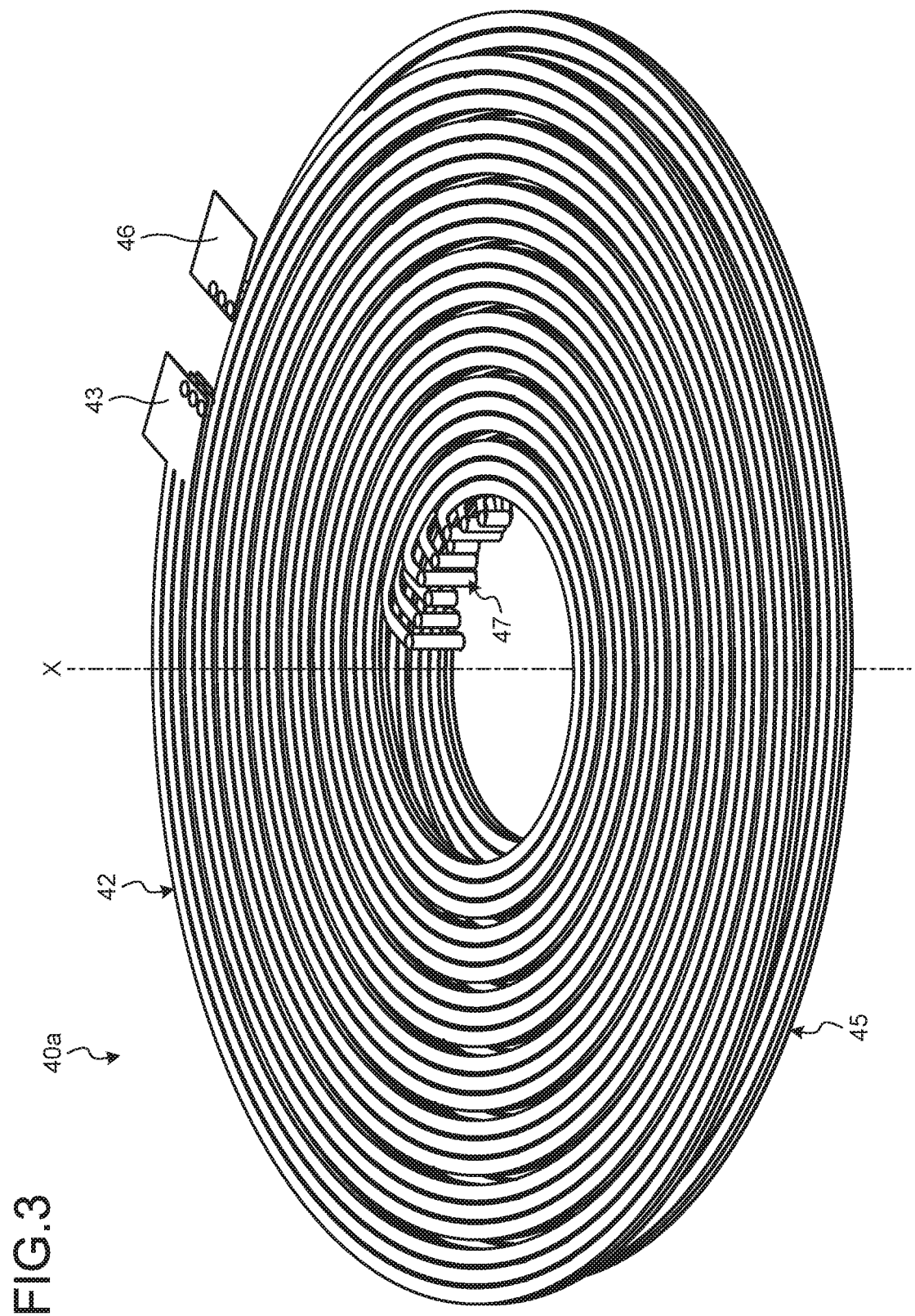
FIG. 3 is a perspective view illustrating a configurational example of a power transmission coil pattern according to the embodiment.
Figure 4:
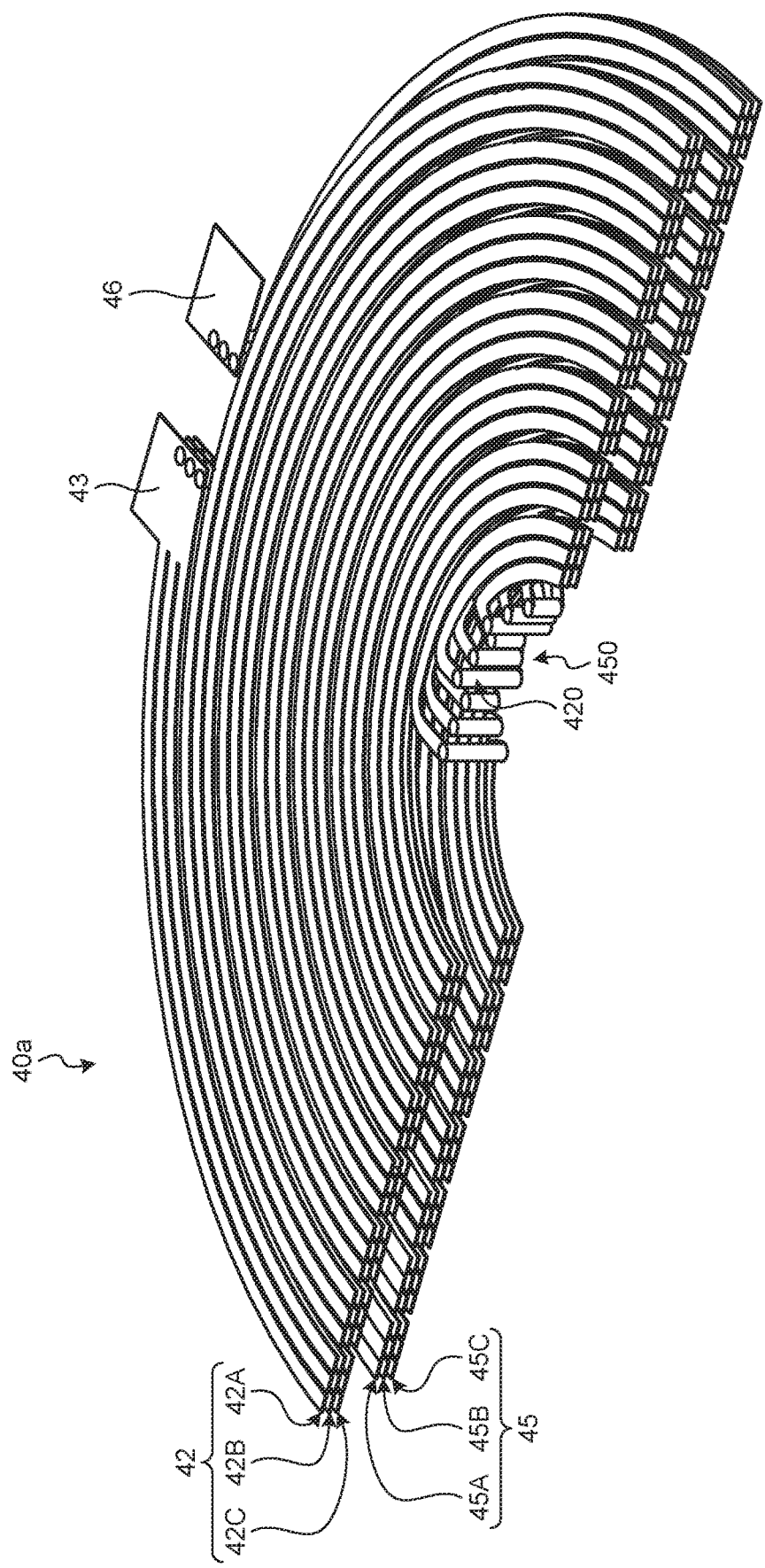
FIG. 4 is a sectional view illustrating the configurational example of the power transmission coil pattern according to the embodiment.
Figure 5:
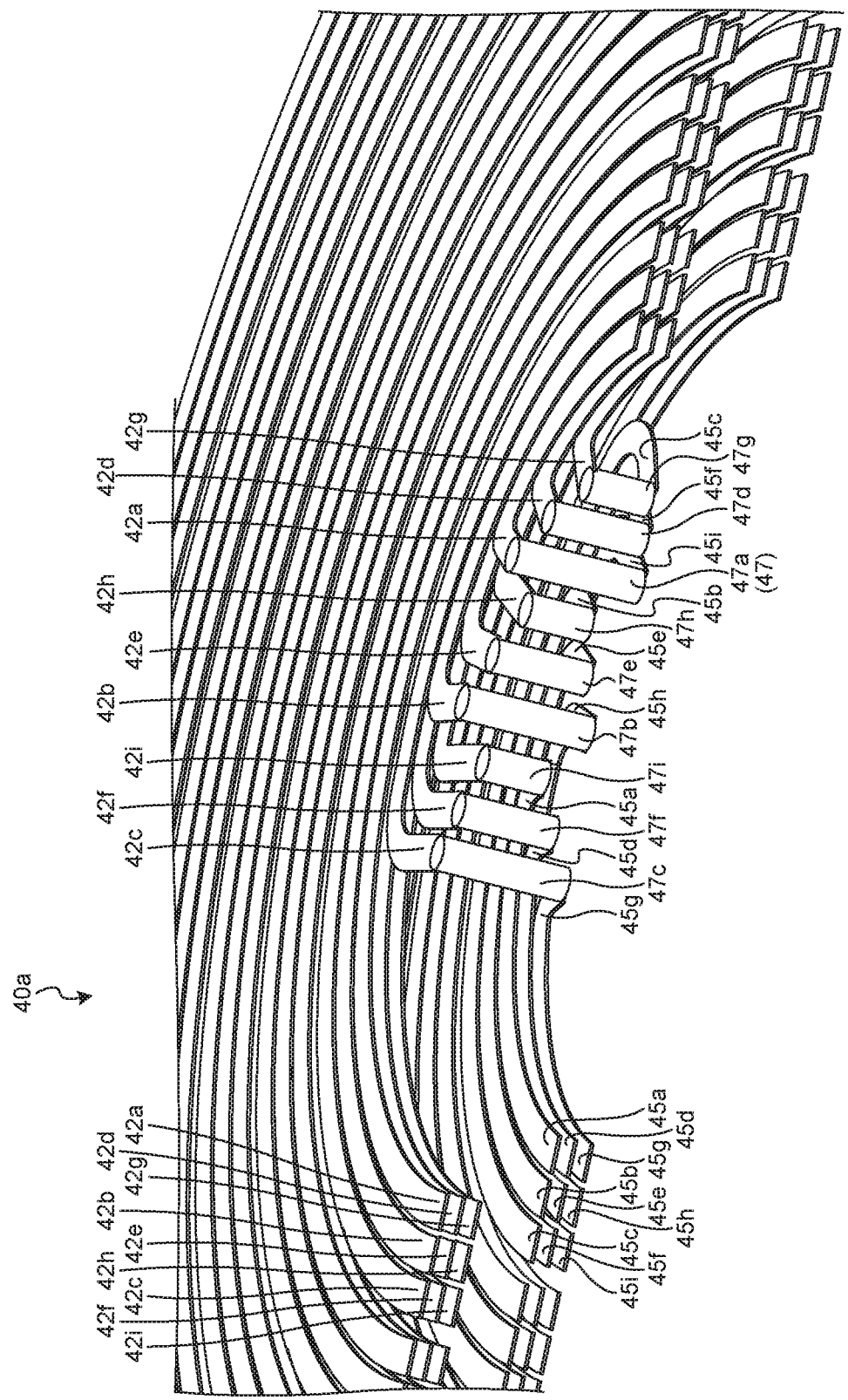
FIG. 5 is a perspective view illustrating a configurational example of connection units of the power transmission coil pattern according to the embodiment.
Figure 6:
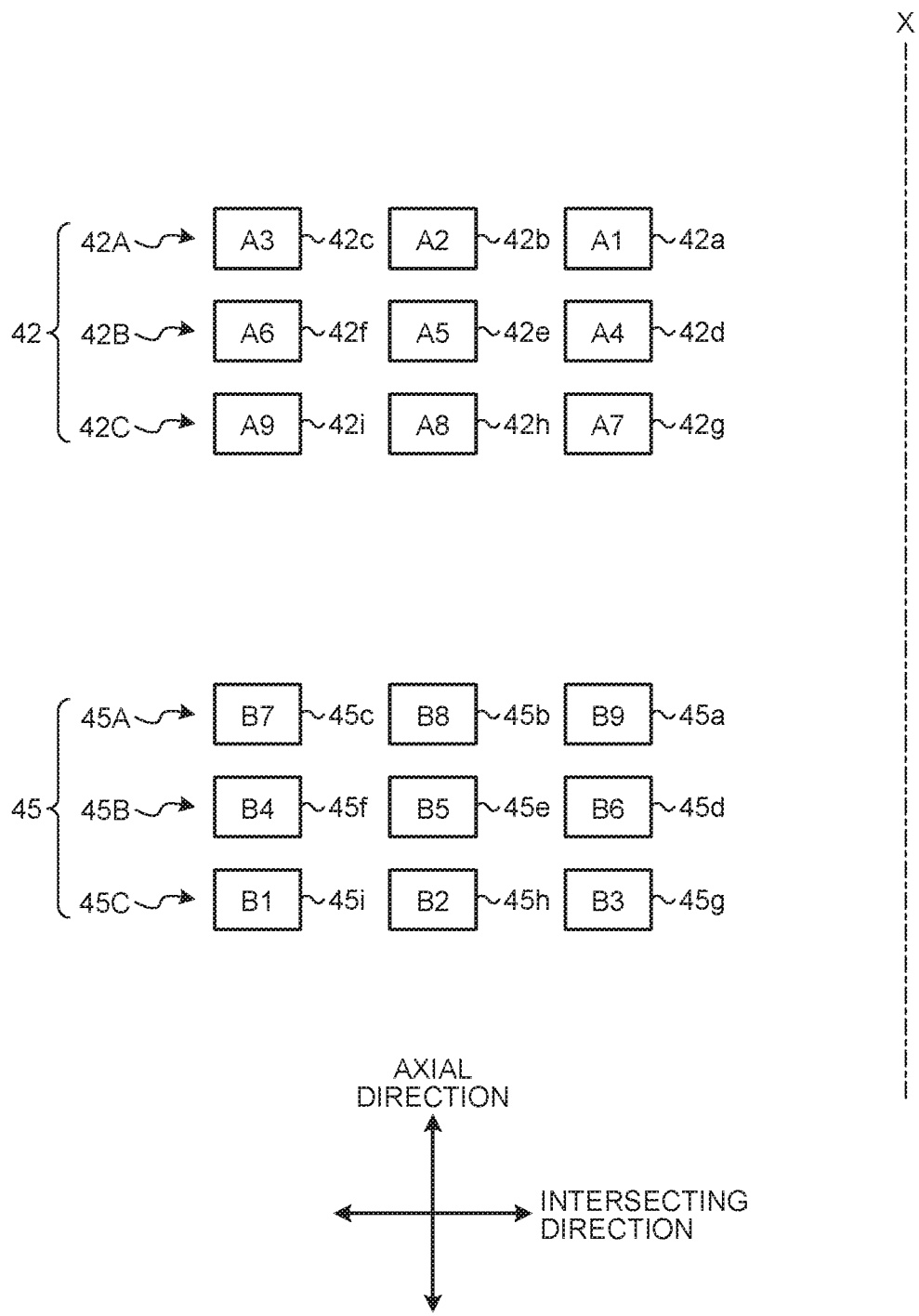
FIG. 6 is schematic drawings illustrating examples of connection of the power transmission coil pattern according to the embodiment.

A power transmission device 1 of the embodiment will now be described with reference to the drawings. FIG. 1 is a sectional view illustrating a configurational example of the electric power transmission device 1 according to an embodiment. FIG. 2 is a perspective view illustrating a configurational example of a multilayer substrate 40 according to the embodiment. FIG. 3 is a perspective view illustrating a configurational example of a power transmission coil pattern 40a according to the embodiment. FIG. 4 is a sectional view illustrating a configurational example of the power transmission coil pattern 40a according to the embodiment. FIG. 5 is a perspective view illustrating a configurational example of connection units of the power transmission coil pattern 40a according to the embodiment. FIG. 6 is a schematic view illustrating an example of connection of the power transmission coil pattern 40a according to the embodiment.

The power transmission device 1 of the embodiment wirelessly transmits electric power. As illustrated in FIG. 1, the power transmission device 1 includes a power transmitter 1A as one of power transmission units and a power receiver 1B as another one of power transmission units. The power transmitter 1A faces the power receiver 1B and wirelessly transmits electric power. The power receiver 1B faces the power transmitter 1A and wirelessly receives electric power. Since the power transmitter 1A and the power receiver 1B use the same configuration, the power transmitter 1A will be described below, and the power receiver 1B will not be described in detail.

As illustrated in FIG. 1, the power transmitter 1A includes an electric wire 10, electronic components 20, a ferrite 30, and a multilayer substrate 40 as a substrate. The electric wire 10 is a conductive wire through which current travels. The electric wire 10 has an end connected to a power supply (not illustrated) for supplying electric power and the other end connected to the multilayer substrate 40. Current sent from the power supply passes through the electric wire 10 to the multilayer substrate 40. The electronic components 20 are mounted on the mounting surface of the multilayer substrate 40 to provide electrical processing.

The ferrite 30 is a member containing a magnetic material. The ferrite 30 is, for example, a complex oxide of iron oxide and metal. The ferrite 30 is, for example, a circular board and is as large as a power transmission coil pattern 40a (see FIG. 3, for example). The ferrite 30 faces the power transmission coil pattern 40a in an axial line direction along an axial line X of the power transmission coil pattern 40a. The ferrite 30 causes magnetic flux, generated by the power transmission coil pattern 40a, to pass therethrough, thereby reducing the loss of the magnetic flux.

The multilayer substrate 40 is usually a printed circuit board to form an electric circuit by mounting various electronic components 20 thereon and electrically connecting the electronic components 20. The multilayer substrate 40 includes a first layer 40A, a second layer 40B, and buried vias 47 (see FIG. 3, for example), and has therein the first layer 40A and the second layer 40B stacked on one over another to be multilayered.

The first layer 40A includes a first substrate 41 and a first coil pattern group 42. The first substrate 41 has a flat plate-like (film-like) shape, and is made of an insulating material such as epoxy resin, glass epoxy resin, paper epoxy resin, and ceramic, for example. The first substrate 41 is provided with a conductive pattern such as, for example, the first coil pattern group 42, the conductive pattern being formed of a conductive member such as copper foil.

The first coil pattern group 42 is conductive patterns formed, on the first substrate 41, of a conductive member such as copper foil. As illustrated in FIG. 2 and FIG. 3, the first coil pattern group 42 is spirally formed around the axial line X and is circular when viewed from the axial line direction. The first coil pattern group 42 has a plurality of coil patterns that are arrayed along a direction intersecting with the axial line direction, and are disposed on respective layers of the first substrate 41 so as to be stacked on one over another along the axial line direction. For example, as illustrated in FIG. 4, the first coil pattern group 42 has a three-layered structure, which includes an upper layer pattern 42A, a middle layer pattern 42B, and a lower layer pattern 42C. The upper layer pattern 42A, the middle layer pattern 42B, and the lower layer pattern 42C are examples of a plurality of first coil patterns, and the layer patterns are disposed on respective layers of the first substrate 41 so as to be stacked on one over another. The lower layer pattern 42C is located closer to a second coil pattern group 45. The middle layer pattern 42B is stacked on the lower layer pattern 42C, particularly, on the side thereof opposite the second coil pattern group 45. The upper layer pattern 42A is stacked on the middle layer pattern 42B, particularly, on the side thereof opposite the second coil pattern group 45.

The upper layer pattern 42A consists of three coil patterns spirally formed around the axial line X. For example, as illustrated in FIG. 5 and FIG. 6, the upper layer pattern 42A includes, as three coil patterns, an upper layer inner pattern (a first upper layer inner pattern) 42a, an upper layer middle pattern 42b, and an upper layer outer pattern (a first upper layer outer pattern) 42c. The upper layer inner pattern 42a, the upper layer middle pattern 42b, and the upper layer outer pattern 42c are arrayed along the intersecting direction to form a parallel transmission path. In the intersecting direction, the upper layer inner pattern 42a is located at the innermost (close to the axial line X) position, and the upper layer outer pattern 42c is located at the outermost position, and the upper layer middle pattern 42b is disposed between the upper layer inner pattern 42a and the upper layer outer pattern 42c.

The middle layer pattern 42B consists of three coil patterns spirally formed around the axial line X. The middle layer pattern 42B includes, as three coil patterns, a middle layer inner pattern 42d, a middle layer middle pattern 42e, and a middle layer outer pattern 42f. The middle layer inner pattern 42d, the middle layer middle pattern 42e, and the middle layer outer pattern 42f are arrayed along the intersecting direction to form a parallel transmission path. In the intersecting direction, the middle layer inner pattern 42d is located at the innermost position, and the middle layer outer pattern 42f is located at the outermost position, and the middle layer middle pattern 42e is disposed between the middle layer inner pattern 42d and the middle layer outer pattern 42f. In the axial line direction, the middle layer inner pattern 42d is located on the upper layer inner pattern 42a, particularly, on the side thereof closer to the second coil pattern group 45. Similarly, the middle layer middle pattern 42e is located on the upper layer middle pattern 42b, particularly, on the side thereof closer to the second coil pattern group 45. The middle layer outer pattern 42f is located on the upper layer outer pattern 42c, particularly, on the side thereof closer to the second coil pattern group 45.

The lower layer pattern 42C consists of three coil patterns spirally formed around the axial line X. The lower layer pattern 42C includes, as three coil patterns, a lower layer inner pattern (a first lower layer inner pattern) 42g, a lower layer middle pattern 42h, and a lower layer outer pattern (a first lower layer outer pattern) 42i. The lower layer inner pattern 42g, the lower layer middle pattern 42h, and the lower layer outer pattern 42i are arrayed along the intersecting direction to form a parallel transmission path. In the intersecting direction, the lower layer inner pattern 42g is located at the innermost position, and the lower layer outer pattern 42i is located at the outermost position, and the lower layer middle pattern 42h is disposed between the lower layer inner pattern 42g and the lower layer outer pattern 42i. In the axial line direction, the lower layer inner pattern 42g is located on the middle layer inner pattern 42d, particularly, on the side thereof closer to the second coil pattern group 45. Similarly, the lower layer middle pattern 42h is located on the middle layer middle pattern 42e, particularly, on the side thereof closer to the second coil pattern group 45. The lower layer outer pattern 42i is located on the middle layer outer pattern 42f, particularly, on the side thereof closer to the second coil pattern group 45. The upper layer pattern 42A, the middle layer pattern 42B, and the lower layer pattern 42C are connected with the coil patterns of the second layer 40B.

The second layer 40B includes a second substrate 44 and the second coil pattern group 45. The second substrate 44 has a flat plate-like (film-like) shape, and is made of an insulating material such as epoxy resin, glass epoxy resin, paper epoxy resin, and ceramic. The second substrate 44 is provided with conductive patterns including, for example, the second coil pattern group 45 formed of a conductive member such as copper foil.

The second coil pattern group 45 is conductive patterns formed, on the second substrate 44, of a conductive member such as copper foil. As illustrated in FIG. 2 and FIG. 3, the second coil pattern group 45 is spirally formed around the axial line X and is circular when viewed from the axial line direction. The second coil pattern group 45 faces the first coil pattern group 42 in the axial line direction. The second coil pattern group 45 has a plurality of coil patterns that are arrayed along the intersecting direction and disposed on respective layers of the second substrate 44 so as to be stacked on one over another along the axial line direction. For example, as illustrated in FIG. 4, the second coil pattern group 45 has a three-layered structure, which includes an upper layer pattern 45A, a middle layer pattern 45B, and a lower layer pattern 45C. The upper layer pattern 45A, the middle layer pattern 45B, and the lower layer pattern 45C are examples of a plurality of second coil patterns. The layer patterns are disposed on respective layers of the second substrate 44 and stacked on one over another. The upper layer pattern 45A is located closer to the first coil pattern group 42. The middle layer pattern 45B is stacked on the upper layer pattern 45A, particularly, on the side thereof opposite the first coil pattern group 42. The lower layer pattern 45C is stacked on the middle layer pattern 45B, particularly, on the side thereof opposite the first coil pattern group 42.

The upper layer pattern 45A consists of three coil patterns spirally formed around the axial line X. For example, as illustrated in FIG. 5 and FIG. 6, the upper layer pattern 45A includes, as three coil patterns, an upper layer inner pattern (a second upper layer inner pattern) 45a, an upper layer middle pattern 45b, and an upper layer outer pattern (a second upper layer outer pattern) 45c. The upper layer inner pattern 45a, the upper layer middle pattern 45b, and the upper layer outer pattern 45c are arrayed along a direction intersecting with the axial line direction to form a parallel transmission path. In the intersecting direction, the upper layer inner pattern 45a is located at the innermost (close to the axial line X) position, and the upper layer outer pattern 45c is located at the outermost position, and the upper layer middle pattern 45b is disposed between the upper layer inner pattern 45a and the upper layer outer pattern 45c.

The middle layer pattern 45B consists of three coil patterns spirally formed around the axial line X. The middle layer pattern 45B includes, as three coil patterns, a middle layer inner pattern 45d, a middle layer middle pattern 45e, and a middle layer outer pattern 45f. The middle layer inner pattern 45d, the middle layer middle pattern 45e, and the middle layer outer pattern 45f are arrayed along a direction intersecting with the axial line direction to form a parallel transmission path. In the intersecting direction, the middle layer inner pattern 45d is located at the innermost position, and the middle layer outer pattern 45f is located at the outermost position, and the middle layer middle pattern 45e is disposed between the middle layer inner pattern 45d and the middle layer outer pattern 45f. In the axial line direction, the middle layer inner pattern 45d is located on the upper layer inner pattern 45a, particularly, on the side thereof opposite the first coil pattern group 42. Similarly, the middle layer middle pattern 45e is located on the upper layer middle pattern 45b, particularly, on the side thereof opposite the first coil pattern group 42. The middle layer outer pattern 45f is located on the upper layer outer pattern 45c, particularly, on the side thereof opposite the first coil pattern group 42.

The lower layer pattern 45C consists of three coil patterns spirally formed around the axial line X. The lower layer pattern 45C includes, as three coil patterns, a lower layer inner pattern (a second lower layer inner pattern) 45g, a lower layer middle pattern 45h, and a lower layer outer pattern (a second lower layer outer pattern) 45i. The lower layer inner pattern 45g, the lower layer middle pattern 45h, and the lower layer outer pattern 45i are arrayed along a direction intersecting with the axial line direction to form a parallel transmission path. In the intersecting direction, the lower layer inner pattern 45g is located at the innermost position, and the lower layer outer pattern 45i is located at the outermost position, and the lower layer middle pattern 45h is disposed between the lower layer inner pattern 45g and the lower layer outer pattern 45i. In the axial line direction, the lower layer inner pattern 45g is located on the middle layer inner pattern 45d, particularly, on the side thereof opposite the first coil pattern group 42. Similarly, the lower layer middle pattern 45h is located on the middle layer middle pattern 45e, particularly, on the side thereof opposite the first coil pattern group 42. The lower layer outer pattern 45i is located on the middle layer outer pattern 45f, particularly, on the side thereof opposite the first coil pattern group 42.

A buried via 47 is embedded in the inner layer of the multilayer substrate 40 and electrically connects patterns formed on respective layers. The buried via 47 includes, for example, buried vias 47a to 47i (see FIG. 5) and connects the first coil pattern group 42 formed on the first layer 40A with the second coil pattern group 45 formed on the second layer 40B.

As illustrated in FIG. 4, in connection of the first and the second coil pattern groups 42 and 45, an end 420, of the first coil pattern group 42, closer to the axial line X is connected with an end 450, of the second coil pattern group 45, closer to the axial line X. Furthermore, in connection of the first and the second coil pattern groups 42 and 45, an outer (the side opposite the second coil pattern group 45) coil pattern of the first coil pattern group 42 in the axial line direction is connected with an outer (the side opposite the first coil pattern group 42) coil pattern of the second coil pattern group 45 in the axial line direction.

In connection of the first and the second coil pattern groups 42 and 45, an inner (the side closer to the second coil pattern group 45) coil pattern of the first coil pattern group 42 in the axial line direction is connected with an inner (the side closer to the first coil pattern group 42) coil pattern of the second coil pattern group 45 in the axial line direction. In connection of the first and the second coil pattern groups 42 and 45, for example, the $n^{th}$ coil pattern from an end surface (from the upper layer) in the axial line direction is connected with the n-th coil pattern from the other end surface (from the lower layer) in the axial line direction.

Furthermore, in connection of the first and the second coil pattern groups 42 and 45, an outer (the side opposite the axial line X) coil pattern of the first coil pattern group 42 in the intersecting direction is connected with an inner (the side closer to the axial line X) coil pattern of the second coil pattern group 45 in the intersecting direction.

Furthermore, in connection of the first and the second coil pattern groups 42 and 45, an inner (the side closer to the axial line X) coil pattern of the first coil pattern group 42 in the intersecting direction is connected with an outer (the side opposite the axial line X) coil pattern of the second coil pattern group 45 in the intersecting direction.

More specifically, as illustrated in FIG. 5 and FIG. 6, in connection of the first and the second coil pattern groups 42 and 45, the upper layer outer pattern 42c is connected with the lower layer inner pattern 45g through the buried via 47c, the upper layer middle pattern 42b is connected with the lower layer middle pattern 45h through the buried via 47b, and the upper layer inner pattern 42a is connected with the lower layer outer pattern 45i through the buried via 47a. Furthermore, in connection of the first and the second coil pattern groups 42 and 45, the middle layer outer pattern 42f is connected with the middle layer inner pattern 45d through the buried via 47f, the middle layer middle pattern 42e is connected with the middle layer middle pattern 45e through the buried via 47e, and the middle layer inner pattern 42d is connected with the middle layer outer pattern 45f through the buried via 47d. Likewise, in connection of the first and the second coil pattern groups 42 and 45, the lower layer outer pattern 42i is connected with the upper layer inner pattern 45a through the buried via 47i, the lower layer middle pattern 42h is connected with the upper layer middle pattern 45b through the buried via 47h, and the lower layer inner pattern 42g is connected with the upper layer outer pattern 45c through the buried via 47g.

The first coil pattern group 42 has an end away from the axial line X connected to a terminal 43 (see FIG. 3, for example). The second coil pattern group 45 has an end away from the axial line X connected to a terminal 46. The first coil pattern group 42 and the second coil pattern group 45 are fed with electric power through the terminals 43 and 46, respectively, and wirelessly transmit power to power transmission coil patterns of the power receiver 1B.

Figure 7:
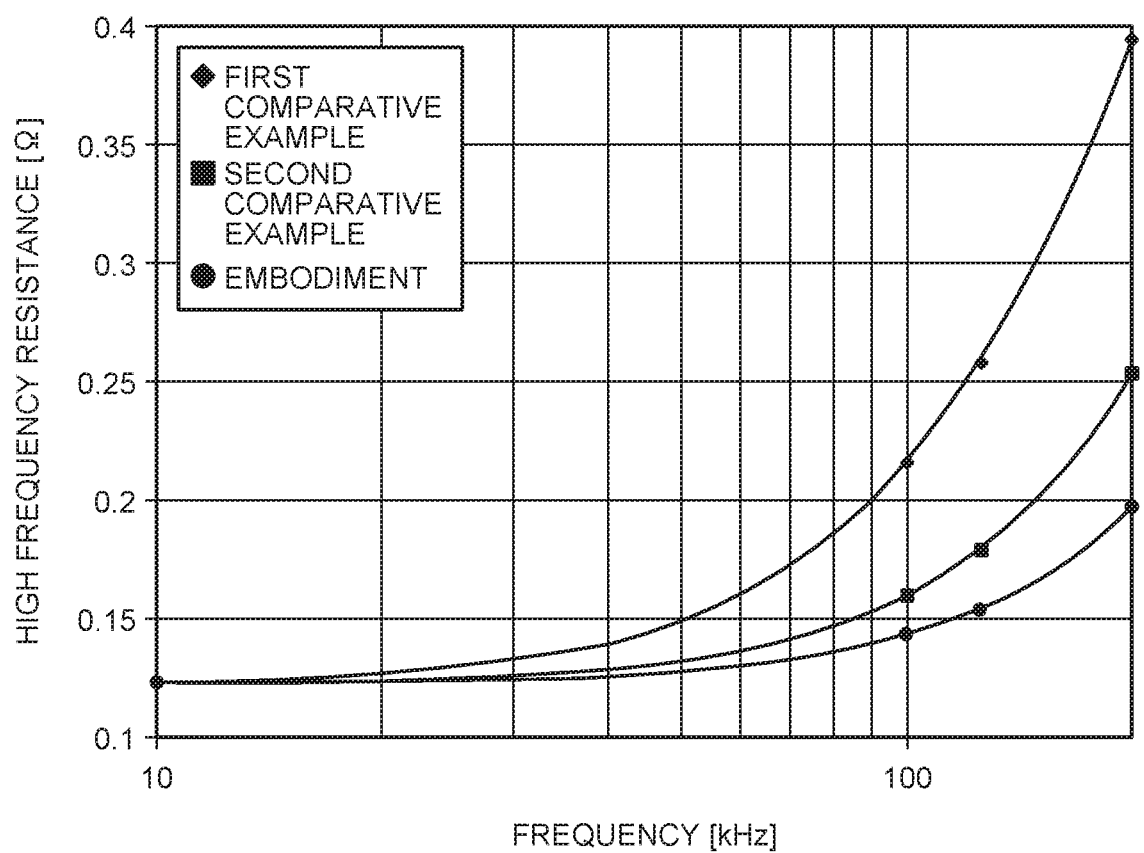
FIG. 7 is a graph indicating high frequency resistance of the power transmission coil patterns according to the embodiment.

High frequency resistance of the power transmission coil pattern 40a will now be described. FIG. 7 is a graph that indicates high frequency resistance of the power transmission coil pattern 40a according to the embodiment. In FIG. 7, the ordinate gives the high frequency resistance ($\Omega$), and the abscissa gives the frequency. In FIG. 7, a power transmission coil pattern (not illustrated) according to a first comparative example has inner coil patterns and outer coil patterns in the intersecting direction connected without alternating the sides. In other words, the power transmission coil pattern according to the first comparative example has inner coil patterns in the intersecting direction connected with each other and has outer coil patterns in the intersecting direction connected with each other. Furthermore, the power transmission coil pattern of the first comparative example has coil patterns of the upper, the middle, and the lower layers connected without changing the layers in the axial line direction. In other words, the power transmission coil pattern of the first comparative example uses the same type of via for connection between upper coil patterns, middle coil patterns, and lower coil patterns in the axial line direction.

The power transmission coil pattern (not illustrated) according to a second comparative example has inner coil patterns and outer coil patterns connected with the sides alternated in the intersecting direction. In other words, the power transmission coil pattern of the second comparative example has an inner coil pattern connected with an outer coil pattern in the intersecting direction. The power transmission coil pattern of the second comparative example, however, has coil patterns of the upper, the middle, and the lower layers connected without changing the layers in the axial line direction. In other words, the power transmission coil pattern of the second comparative example uses the same type of via for connection between upper coil patterns, middle coil patterns, and lower coil patterns in the axial line direction.

As illustrated in FIG. 7, for example, at frequencies around 100 kHz, the power transmission coil pattern 40*a* of the embodiment has the smallest high frequency resistance, and the power transmission coil pattern of the second comparative example has the second smallest high frequency resistance. This tendency is more noticeable with an increase in the frequency.

Figure 8:
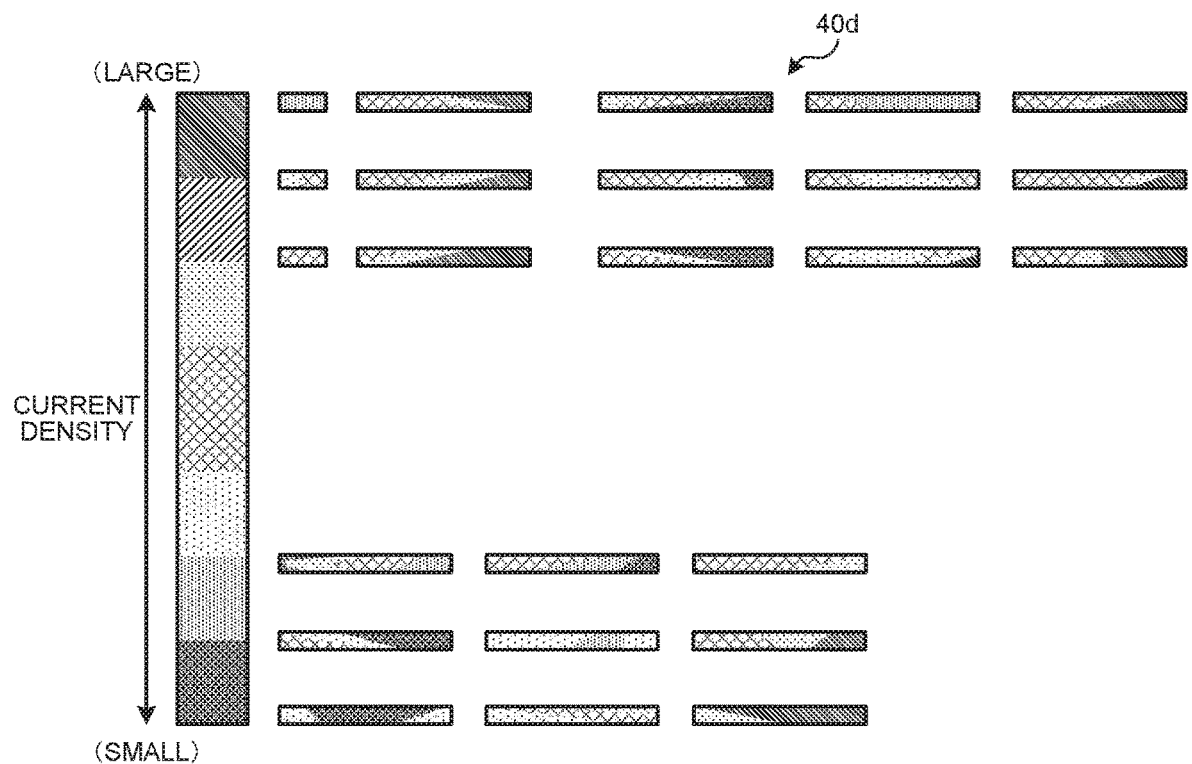
FIG. 8 is a drawing illustrating a distribution of current density of power transmission coil patterns according to a comparative example.
Figure 9:
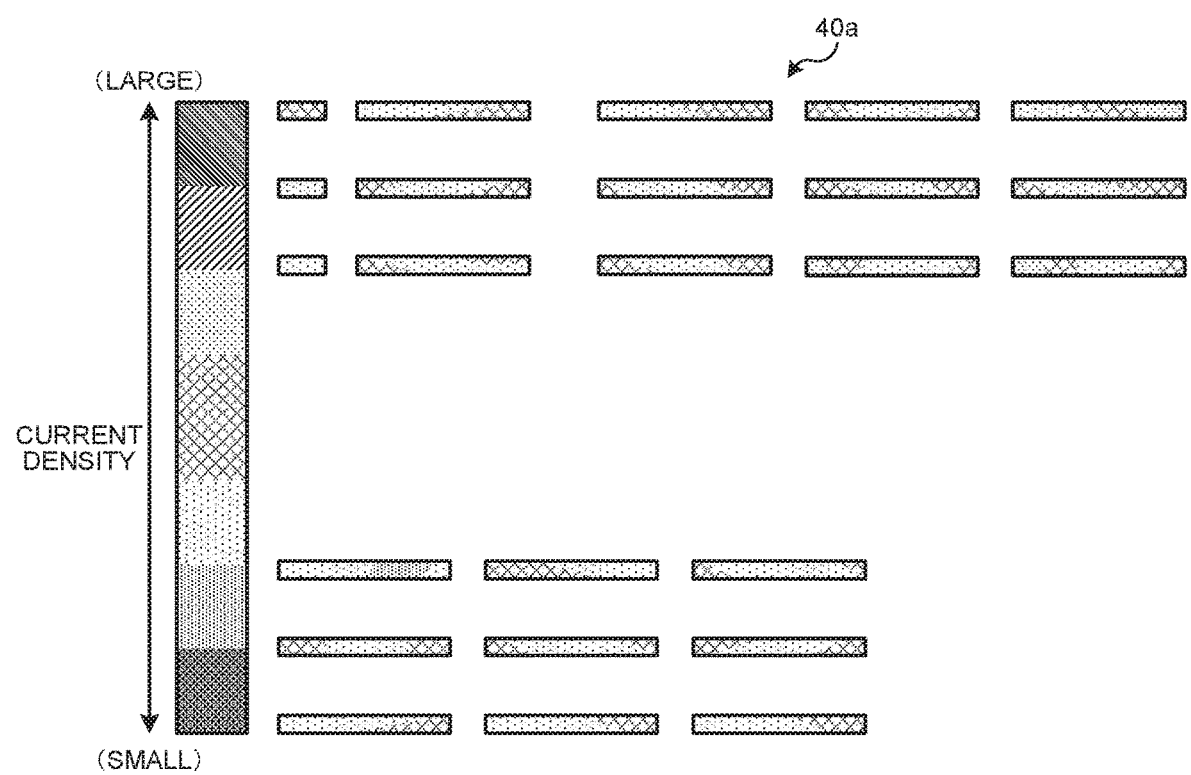
FIG. 9 is a drawing illustrating a distribution of current density of the power transmission coil patterns according to the embodiment.

The distribution of current density of the power transmission coil pattern 40*a* will now be described. FIG. 8 is a drawing that illustrates the distribution of current density of a power transmission coil pattern 40*d* according to a comparative example. FIG. 9 is a drawing that illustrates the distribution of current density of the power transmission coil pattern 40*a* according to the embodiment. The power transmission coil pattern 40*d* according to the comparative example has inner coil patterns connected with each other and outer coil patterns connected with each other, in the intersecting direction. The power transmission coil pattern 40*d* further has coil patterns of the upper, the middle, and the lower layers connected with coil patterns of the same layers in the axial line direction. In the power transmission coil pattern 40*d* of the comparative example, as illustrated in FIG. 8, current is concentrated at an end of the coil pattern due to the proximity effect, and is hard to flow through the center area of the coil pattern. This phenomenon causes the power transmission coil pattern 40*d* to have a relatively small effective conductive area in which current flows and have relatively large high frequency resistance. In the power transmission coil pattern 40*a* of the embodiment, as illustrated in FIG. 9, current evenly flows without being concentrated in a certain area of the coil pattern. This structure allows the power transmission coil pattern 40*a* to maintain the effective conductive area in which current flows and reduce an increase in the high frequency resistance. The power transmission coil pattern 40*a* is therefore capable of reducing the proximity effect.

Figure 10:
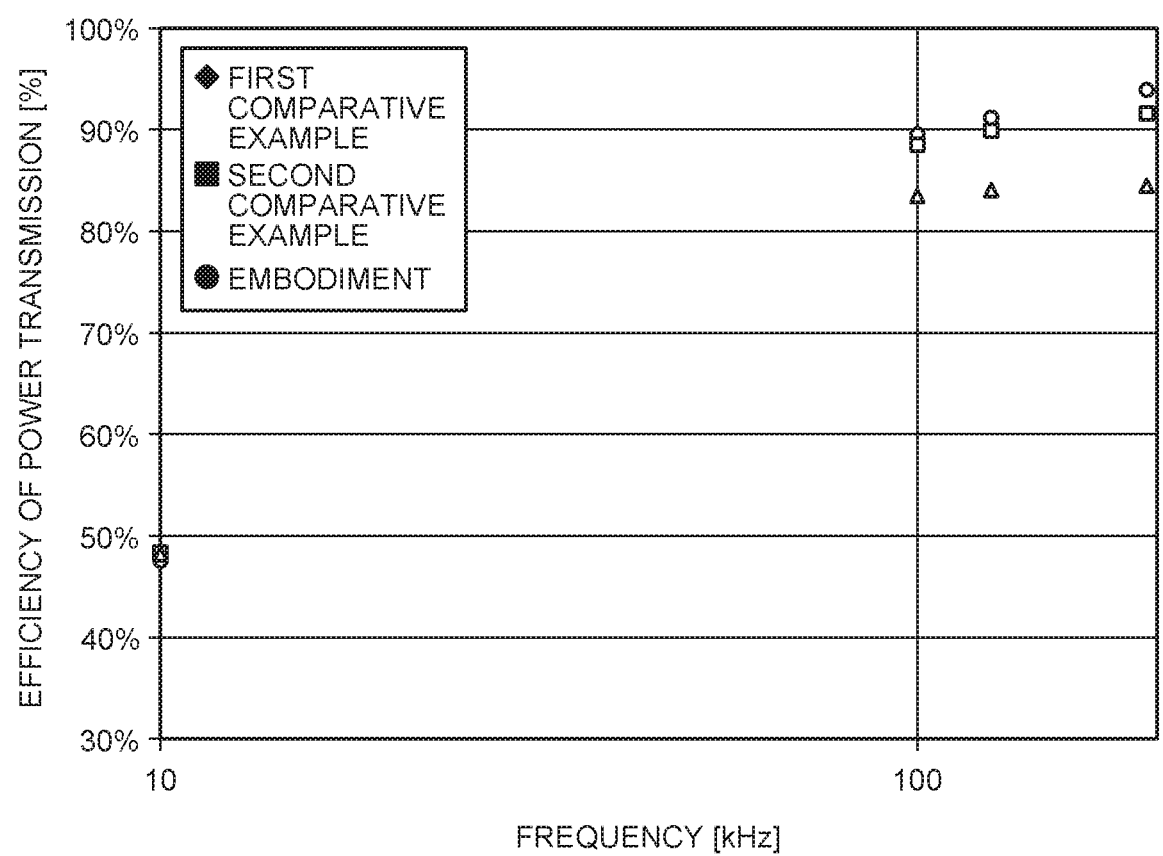
FIG. 10 is a graph indicating the efficiency of power transmission of the power transmission coil patterns according to the embodiment.

The efficiency of power transmission of the power transmission coil pattern 40*a* will now be described. FIG. 10 is a graph that indicates the efficiency of power transmission of the power transmission coil pattern 40*a* according to the embodiment. In FIG. 10, the ordinate gives the efficiency of power transmission, and the abscissa gives the frequency. In FIG. 7, a power transmission coil of the first comparative example is made of a litz wire. The litz wire is made of a bundle of 24 strands, the diameter of each of which is 0.08 mm. A power transmission coil pattern according to a second comparative example has inner coil patterns connected with each other and outer coil patterns connected with each other, in the intersecting direction. The power transmission coil pattern further has coil patterns of the upper, the middle, and the lower layers connected with coil patterns of the same layers in the axial line direction. As illustrated in FIG. 10, for example, at frequencies around 100 kHz, the power transmission coil (litz wire) of the first comparative example has the efficiency of power transmission of about 90%, the power transmission coil pattern 40*a* of the embodiment has that of about 89%, and the power transmission coil pattern of the second comparative example has that of about 84%. The results indicate that the power transmission coil pattern 40*a* of the embodiment is allowed to have substantially as large power transmission efficiency as that of the power transmission coil (litz wire) of the first comparative example at frequencies around 100 kHz.

As described above, the power transmitter 1A according to the embodiment includes the multilayer substrate 40 consisting of the first layer 40A and the second layer 40B stacked on the first layer 40A. The first layer 40A includes a flat plate-like first substrate 41 and the first coil pattern group 42 having a plurality of first coil patterns spirally formed around the axial line X and formed on the first substrate 41. Specifically, the first coil patterns include the upper layer pattern 42A, the middle layer pattern 42B, and the lower layer pattern 42C. The second layer 40B includes a flat plate-like second substrate 44 and the second coil pattern group 45 having a plurality of second coil patterns spirally formed around the axial line X and formed on the second substrate 44. Specifically, the second coil patterns include the upper layer pattern 45A, the middle layer pattern 45B, and the lower layer pattern 45C. The first coil pattern group 42 has a plurality of first coil patterns arrayed along a direction intersecting with the axial line X and further has the first coil patterns disposed on respective layers of the first substrate 41 so as to be stacked on one over another along the axial line direction. The second coil pattern group 45 has a plurality of second coil patterns arrayed along the intersecting direction and further has the second coil patterns disposed on respective layers of the second substrate 44 so as to be stacked on one over another along the axial line direction.

The first and the second coil pattern groups 42 and 45 are connected with each other with the upper layer outer pattern 42*c*, located outside in the axial line direction and outside in the intersecting direction, connected with the lower layer inner pattern 45*g*, located outside in the axial line direction and inside in the intersecting direction. Furthermore, in connection of the first and the second coil pattern groups 42 and 45, the lower layer outer pattern 42*i*, located inside in the axial line direction and outside in the intersecting direction, is connected with the upper layer inner pattern 45*a*, located inside in the axial line direction and inside in the intersecting direction. The first and the second coil pattern groups 42 and 45 wirelessly transmit electric power to counterpart power transmission coil patterns.

The power transmitter 1A includes the first coil pattern group 42 and the second coil pattern group 45, each of which has a plurality of patterns. This configuration is beneficial in reducing the skin effect. The power transmitter 1A is further allowed to have an increased number of coil windings by connecting the first coil pattern group 42 and the second coil pattern group 45 with each other. Furthermore, the power transmitter 1A is capable of reducing the effect of magnetic flux by connecting an inner pattern with an outer pattern in pattern connection, thereby reducing the proximity effect. The power transmitter 1A is further capable of reducing the effect of magnetic flux by connecting upper layers with each other in pattern connection, thereby reducing the proximity effect. This configuration allows the power transmitter 1A to reduce the high frequency resistance and accordingly reduce heat loss. Consequently, the power transmitter 1A is capable of improving the efficiency of power transmission and wirelessly transmitting electric power in a proper manner.

Compared to a coil made of litz wire, the power transmitter 1A can be more simply manufactured through a manufacturing process without strand manufacturing, enamel coating, twisting, coil winding, coil end treatment, or coil bonding. Such a traditional coil made of litz wire needs to prepare separate substrates for mounting the electronic components 20 and for mounting coils and to connect these substrates together. The power transmitter 1A is allowed to mount the electronic components 20 and the power transmission coil pattern 40a on the same multilayer substrate 40, which can save the process of connecting the multilayer substrates 40 together. The power transmitter 1A in this configuration is therefore beneficial in reducing the manufacturing cost and inspection cost.

The first and the second coil pattern groups 42 and 45 of the power transmitter 1A is connected with each other with the upper layer inner pattern 42a, located outside in the axial line direction and inside in the intersecting direction, connected with the lower layer outer pattern 45i, located outside in the axial line direction and outside in the intersecting direction. Furthermore, in connection of the first and the second coil pattern groups 42 and 45, the lower layer inner pattern 42g, located inside in the axial line direction and inside in the intersecting direction, is connected with the upper layer outer pattern 45c, located inside in the axial line direction and outside in the intersecting direction. This configuration allows the power transmitter 1A to reduce the proximity effect and to wirelessly transmit electric power in a proper manner.

The first coil pattern group 42 of the power transmitter 1A has, as a plurality of first coil patterns, the upper layer inner pattern 42a, the upper layer outer pattern 42c located outside the upper layer inner pattern 42a in the intersecting direction, the lower layer inner pattern 42g located on the upper layer inner pattern 42a, particularly, on the side thereof closer to the second coil pattern group 45, and the lower layer outer pattern 42i located outside the lower layer inner pattern 42g in the intersecting direction. Similarly, the second coil pattern group 45 has, as a plurality of second coil patterns, the upper layer inner pattern 45a, the upper layer outer pattern 45c located outside the upper layer inner pattern 45a in the intersecting direction, the lower layer inner pattern 45g located on the upper layer inner pattern 45a, particularly on the side thereof opposite the first coil pattern group 42, and the lower layer outer pattern 45i located outside the lower layer inner pattern 45g in the intersecting direction. In connection of the first and the second coil pattern groups 42 and 45, the upper layer outer pattern 42c is connected with the lower layer inner pattern 45g, the upper layer inner pattern 42a is connected with the lower layer outer pattern 45i, the lower layer outer pattern 42i is connected with the upper layer inner pattern 45a, and the lower layer inner pattern 42g is connected with the upper layer outer pattern 45c. This configuration allows the power transmitter 1A to reduce the proximity effect and to wirelessly transmit electric power in a proper manner.

In connection of the first and the second coil pattern groups 42 and 45 of the power transmitter 1A, the ends 420, of the upper layer pattern 42A, the middle layer pattern 42B, and the lower layer pattern 42C, closer to the axial line X are connected with the ends 450, of the upper layer pattern 45A, the middle layer pattern 45B, and the lower layer pattern 45C, closer to the axial line X. This configuration allows the power transmitter 1A to connect the first coil pattern group 42 and the second coil pattern group 45 with each other on the sides thereof closer to the axial line X of the power transmission coil pattern 40a.

Modification

Figure 11:
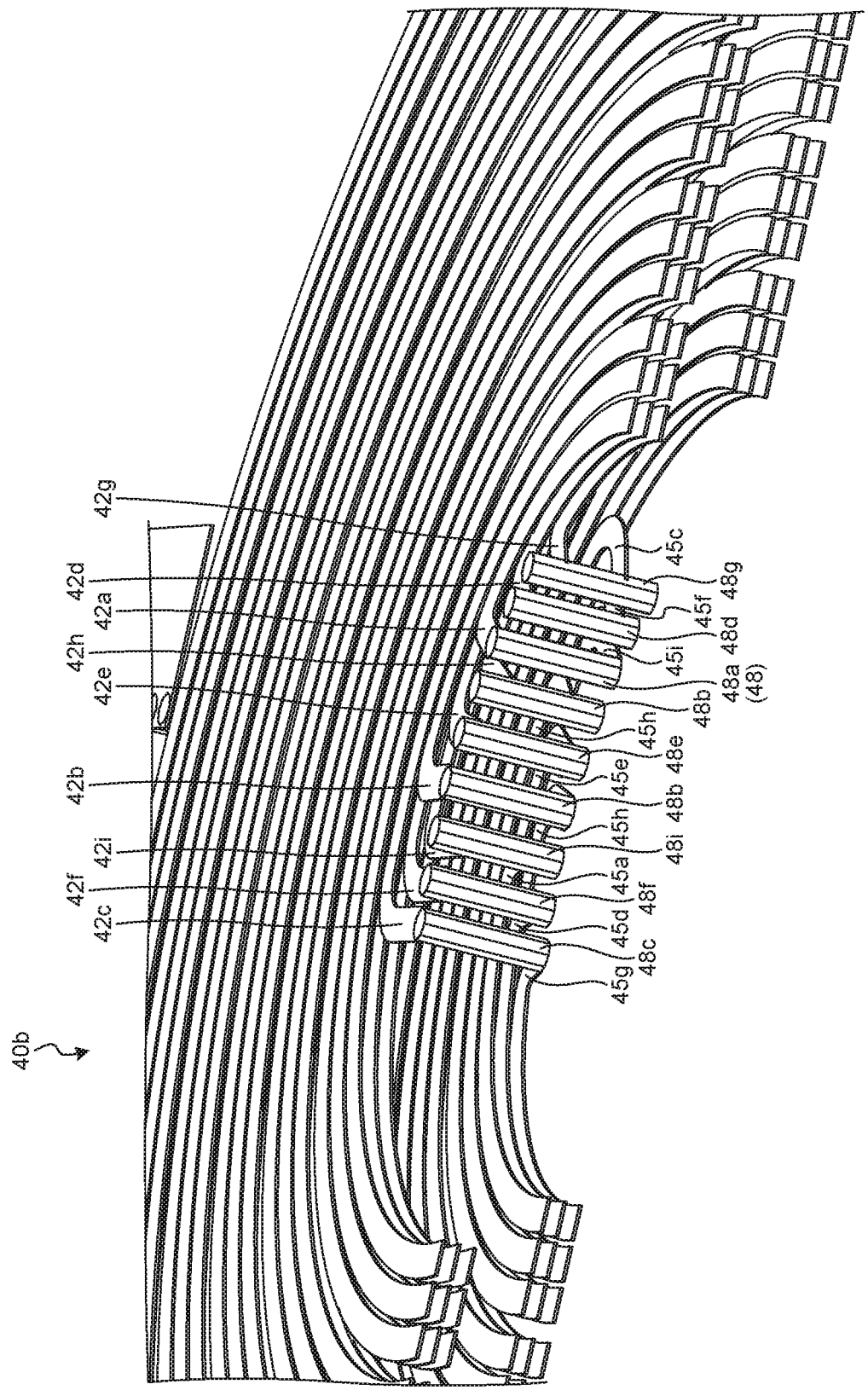
FIG. 11 is a perspective view illustrating a configurational example of connection units for power transmission coil patterns according to a first modification of the embodiment.

A first modification and a second modification of the embodiment will now be described. FIG. 11 is a perspective view illustrating a configurational example of connection units of a power transmission coil pattern 40b according to a first modification of the embodiment. The power transmission coil pattern 40b of the first modification is different from the power transmission coil pattern 40a of the embodiment in that the first coil pattern group 42 and the second coil pattern group 45 are connected by through-hole vias 48 instead of the buried vias 47. The patterns 42a to 42i of the first coil pattern group 42 are disposed such that the respective connection ends do not overlap the patterns in the axial line direction. Likewise, the patterns 45a to 45i of the second coil pattern group 45 are disposed such that the respective connection ends do not overlap the patterns in the axial line direction. As illustrated in FIG. 11, the through-hole via 48 is disposed along the inner periphery of the power transmission coil pattern 40b and penetrates all the layers of the multilayer substrate 40. The through-hole via 48 electrically connects patterns formed on respective layers with each other. The through-hole via 48 includes, for example, through-hole vias 48a to 48i through which the patterns 42a to 42i of the first coil pattern group 42 connect with the patterns 45a to 45i of the second coil pattern group 45.

Figure 12:
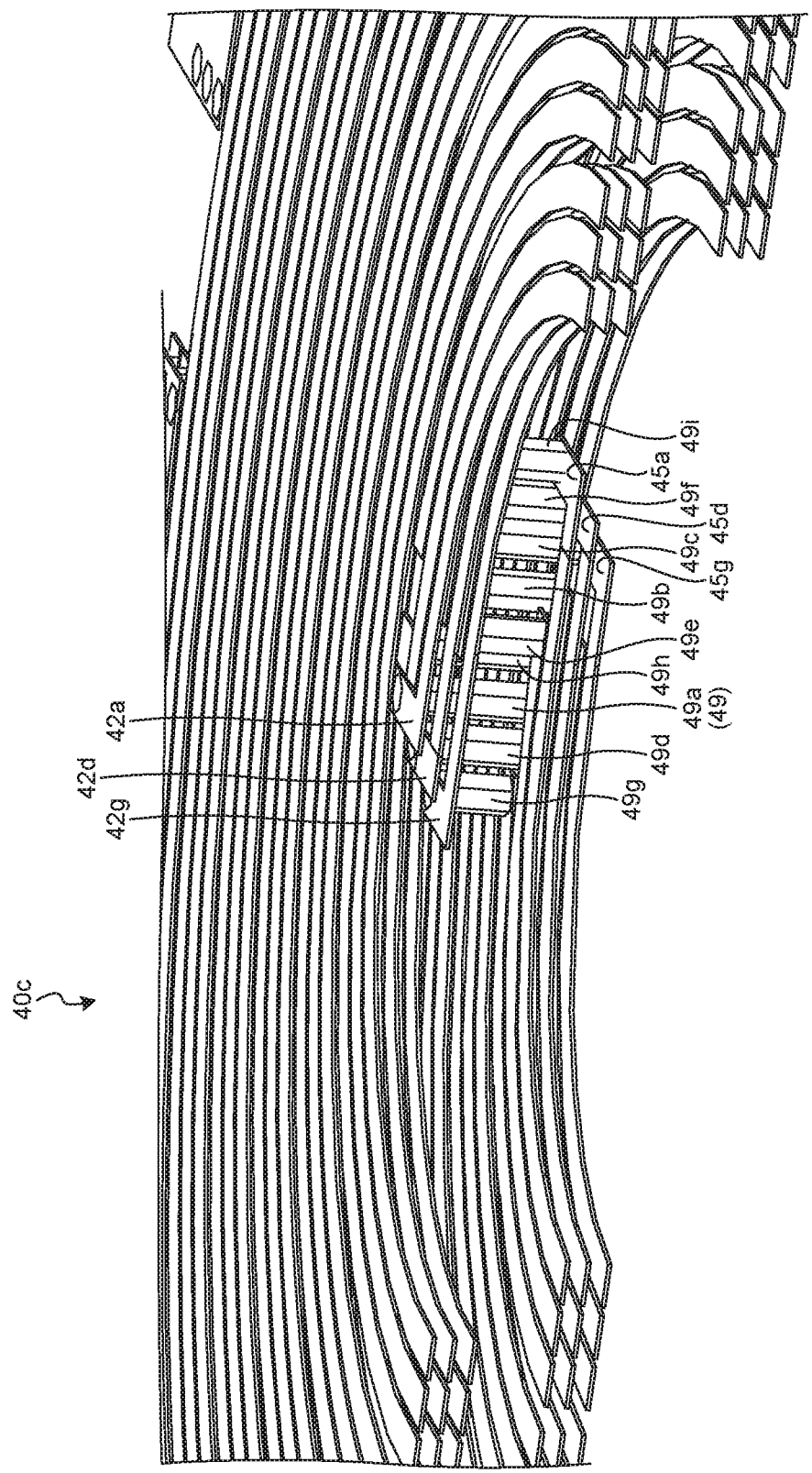
FIG. 12 is a perspective view illustrating a configurational example of connection units for power transmission coil patterns according to a second modification of the embodiment.

FIG. 12 is a perspective view illustrating a configurational example of connection units of a power transmission coil pattern 40c according to a second modification of the embodiment. The power transmission coil pattern 40c of the second modification is different from the power transmission coil pattern 40a of the embodiment in that the first coil pattern group 42 and the second coil pattern group 45 are connected together by buried vias 49 instead of the buried vias 47. As illustrated in FIG. 12, the buried via 49 is embedded in the inner layer of the multilayer substrate 40 and electrically connects patterns formed on respective layers with each other. The buried via 49 includes, for example, buried vias 49a to 49i through which the patterns 42a to 42i of the first coil pattern group 42 connect with the patterns 45a to 45i of the second coil pattern group 45. The buried via 49 embedded in the inner layer is capable of connecting the corresponding connection ends of the first and the second coil pattern groups 42 and 45 (the patterns 42a to 42i and the patterns 45a to 45i), even when the connection ends overlap the patterns in the axial line direction. Use of the buried via 49 allows the power transmission coil pattern 40c to reduce the area allocated for the power transmission coil pattern 40c on the multilayer substrate 40.

The multilayer substrate 40 has been described as a double-layered structure having the first layer 40A and the second layer 40B stacked on one over another; however, without being limited to this example, the multilayer substrate 40 may have a structure with three or more layers stacked.

The multilayer substrate 40 has been described as a multilayered structure in which the first layer 40A and the second layer 40B are stacked on one over another; however, without being limited to this example, the first layer 40A and the second layer 40B may be separate substrates.

The first coil pattern group 42 has been described as a three-layered structure having the upper layer pattern 42A, the middle layer pattern 42B, and the lower layer pattern 42C; however, without being limited to this example, the first coil pattern group 42 may have two layers, or four or more layers. Likewise, the second coil pattern group 45 has been described as a three-layered structure having the upper layer pattern 45A, the middle layer pattern 45B, and the lower layer pattern 45C; however, without being limited to this example, the second coil pattern group 45 may have two layers, or four or more layers.

In the above described example, the upper layer pattern 42A, the middle layer pattern 42B, and the lower layer pattern 42C each include respective three coil patterns;

however, without being limited to this example, each pattern may include two coil patterns or four or more coil patterns.

In the above described example, the first and the second coil pattern groups 42 and 45 are circular when viewed from the axial line direction; however, without being limited to this example, the coil pattern groups may be circular or in other shapes when viewed from the axial line direction.

In the above described example, the first and the second coil pattern groups 42 and 45 have respective ends 420 and 450 that are closer to the X axis connected with each other; however, without being limited to this example, the coil pattern groups may have respective ends that are located away from the X axis connected with each other.

A power transmission unit according to the present embodiment connects a first coil pattern group and a second coil pattern group such that an inner coil pattern and an outer coil pattern are connected with the sides alternated in the intersecting direction and that outer coil patterns in the axial line direction are connected with each other. This manner of connection can reduce the proximity effect and allows the power transmission unit to wirelessly transmit electric power in a proper manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission unit comprising:
   a substrate that includes a first layer including a flat plate-like first substrate and a first coil pattern group having a plurality of first coil patterns spirally formed around an axial line and disposed on the first substrate, and a second layer including a flat plate-like second substrate and a second coil pattern group having a plurality of second coil patterns spirally formed around the axial line and disposed on the second substrate, wherein
   the first coil pattern group has the first coil patterns arrayed along a direction intersecting with the axial line and disposed on respective layers of the first substrate in a manner of being stacked on one over another along an axial line direction,
   the second coil pattern group has the second coil patterns arrayed in the intersecting direction and disposed on respective layers of the second substrate in a manner of being stacked on one over another along the axial line direction, and
   the first coil pattern group and the second coil pattern group are connected with each other with the first coil pattern, located outside in the axial line direction and outside in the intersecting direction, connected with the second coil pattern, located outside in the axial line direction and inside in the intersecting direction, and with the first coil pattern, located inside in the axial line direction and outside in the intersecting direction, connected with the second coil pattern, located inside in the axial line direction and inside in the intersecting direction, and wirelessly transmit electric power to a counterpart power transmission coil pattern.

2. The power transmission unit according to claim 1, wherein
   the first coil pattern group and the second coil pattern group are connected with each other with the first coil pattern, located outside in the axial line direction and inside in the intersecting direction, connected with the second coil pattern, located outside in the axial line direction and outside in the intersecting direction, and with the first coil pattern, located inside in the axial line direction and inside in the intersecting direction, connected with the second coil pattern, located inside in the axial line direction and outside in the intersecting direction.

3. The power transmission unit according to claim 1, wherein
   the first coil pattern group includes the first coil patterns, that are a first upper layer inner pattern, a first upper layer outer pattern located outside the first upper layer inner pattern in the intersecting direction, a first lower layer inner pattern located on the first upper layer inner pattern, particularly on a side closer to the second coil pattern group, and a first lower layer outer pattern located outside the first lower layer inner pattern in the intersecting direction,
   the second coil pattern group includes the second coil patterns, that are a second upper layer inner pattern, a second upper layer outer pattern located outside the second upper layer inner pattern in the intersecting direction, a second lower layer inner pattern located on the second upper layer inner pattern, particularly on a side opposite the first coil pattern group, and a second lower layer outer pattern located outside the second lower layer inner pattern in the intersecting direction, and
   in connection of the first coil pattern group and the second coil pattern group, the first upper layer outer pattern is connected with the second lower layer inner pattern, the first upper layer inner pattern is connected with the second lower layer outer pattern, the first lower layer outer pattern is connected with the second upper layer inner pattern, and the first lower layer inner pattern is connected with the second upper layer outer pattern.

4. The power transmission unit according to claim 2, wherein
   the first coil pattern group includes the first coil patterns, that are a first upper layer inner pattern, a first upper layer outer pattern located outside the first upper layer inner pattern in the intersecting direction, a first lower layer inner pattern located on the first upper layer inner pattern, particularly on a side closer to the second coil pattern group, and a first lower layer outer pattern located outside the first lower layer inner pattern in the intersecting direction,
   the second coil pattern group includes the second coil patterns, that are a second upper layer inner pattern, a second upper layer outer pattern located outside the second upper layer inner pattern in the intersecting direction, a second lower layer inner pattern located on the second upper layer inner pattern, particularly on a side opposite the first coil pattern group, and a second lower layer outer pattern located outside the second lower layer inner pattern in the intersecting direction, and
   in connection of the first coil pattern group and the second coil pattern group, the first upper layer outer pattern is connected with the second lower layer inner pattern, the first upper layer inner pattern is connected with the second lower layer outer pattern, the first lower layer outer pattern is connected with the second upper layer inner pattern, and the first lower layer inner pattern is connected with the second upper layer outer pattern.

5. The power transmission unit according to claim 1, wherein in connection of the first coil pattern group and the second coil pattern group, ends of the first coil patterns closer to the axial line are connected with ends of the second coil patterns closer to the axial line.

6. The power transmission unit according to claim 2, wherein in connection of the first coil pattern group and the second coil pattern group, ends of the first coil patterns closer to the axial line are connected with ends of the second coil patterns closer to the axial line.

7. The power transmission unit according to claim 3, wherein in connection of the first coil pattern group and the second coil pattern group, ends of the first coil patterns closer to the axial line are connected with ends of the second coil patterns closer to the axial line.

8. The power transmission unit according to claim 4, wherein in connection of the first coil pattern group and the second coil pattern group, ends of the first coil patterns closer to the axial line are connected with ends of the second coil patterns closer to the axial line.

\* \* \* \* \*